US008285224B2

(12) United States Patent

Kondo et al.

(10) Patent No.: US 8,285,224 B2

(45) Date of Patent: Oct. 9, 2012

(54) TRANSMITTER/RECEIVER FOR RADIO COMMUNICATION, RFID SYSTEM AND RECEIVING METHOD FOR TRANSMITTER/RECEIVER FOR RADIO COMMUNICATION

(75) Inventors: Ryoichi Kondo, Tokyo (JP); Shinichirou Mochizuki, Tokyo (JP)

(73) Assignee: TDK Corporation, Tokyo (JP)

( * ) Notice: Subject to any disclaimer, the term of this patent is extended or adjusted under 35 U.S.C. 154(b) by 1118 days.

(21) Appl. No.: 12/175,189

(22) Filed: Jul. 17, 2008

(65) Prior Publication Data

US 2009/0027169 A1 Jan. 29, 2009

(30) Foreign Application Priority Data

Jul. 26, 2007 (JP) ............................... P2007-194653

(51) Int. Cl.
*H04B 1/38* (2006.01)

(52) U.S. Cl. ........................................... 455/73; 455/83

(58) Field of Classification Search .................... 455/39, 455/78–83, 255, 280, 343.1, 343.2; 340/10.2, 340/10.4, 12.51, 13.27; 342/70, 109, 114, 342/42

See application file for complete search history.

(56) References Cited

U.S. PATENT DOCUMENTS

| | | | | |
|---|---|---|---|---|
| 5,469,114 | A * | 11/1995 | Saxena | 330/107 |
| 6,028,503 | A * | 2/2000 | Preishuberpflugl et al. | 340/10.4 |
| 6,491,230 | B1 | 12/2002 | Dubost et al. | |
| 6,738,439 | B1 * | 5/2004 | Okanoue et al. | 375/347 |
| 6,919,861 | B2 * | 7/2005 | Miyano et al. | 343/904 |
| 7,132,946 | B2 | 11/2006 | Waldner et al. | |
| 2002/0197974 | A1 * | 12/2002 | Weinholt et al. | 455/313 |
| 2003/0128152 | A1 * | 7/2003 | Puglia | 342/70 |
| 2006/0166638 | A1 * | 7/2006 | Iwaida | 455/318 |

FOREIGN PATENT DOCUMENTS

| | | |
|---|---|---|
| JP | A-04-026099 | 1/1992 |
| JP | A-09-046283 | 2/1997 |
| JP | A-09-062816 | 3/1997 |
| JP | A-10-187916 | 7/1998 |
| JP | A-2000-151481 | 5/2000 |
| JP | A-2001-109861 | 4/2001 |
| JP | A-2001-109862 | 4/2001 |
| JP | A-2002-521758 | 7/2002 |
| JP | A-2002-334310 | 11/2002 |

(Continued)

OTHER PUBLICATIONS

Finkenzeller, Klaus, "RFID Handbook", Second Edition, Nikkan Kogyo Shimbun Co., May 31, 2004, pp. 287.

*Primary Examiner* — Lana N Le
*Assistant Examiner* — Golam Sorowar
(74) *Attorney, Agent, or Firm* — Oliff & Berridge, PLC

(57) ABSTRACT

A transmitter/receiver for radio communication according to an embodiment of the present invention has: a transmission circuit for generating a transmission signal; a demodulation circuit for demodulating a receive signal; an antenna circuit for transmitting the transmission signal from the transmission circuit and receiving the receive signal and guiding the receive signal to the demodulation circuit; a phase shift circuit which is connected between the transmission circuit and the antenna circuit; and a switching circuit which switches between outputting a superimposed signal of the transmission signal and the receive signal between the phase shift circuit and the antenna circuit to the demodulation circuit, and outputting a superimposed signal of the transmission signal and the receive signal between the transmission circuit and the phase shift circuit to the demodulation circuit.

4 Claims, 10 Drawing Sheets

FOREIGN PATENT DOCUMENTS

| | | |
|---|---|---|
| JP | A-2003-067693 | 3/2003 |
| JP | A-2003-298463 | 10/2003 |
| JP | A-2004-062665 | 2/2004 |
| JP | A-2004-102404 | 4/2004 |
| JP | A-2005-086419 | 3/2005 |
| JP | A-2005-519491 | 6/2005 |

* cited by examiner (a)

(b)

TRANSMITTER/RECEIVER FOR RADIO COMMUNICATION, RFID SYSTEM AND RECEIVING METHOD FOR TRANSMITTER/RECEIVER FOR RADIO COMMUNICATION

BACKGROUND OF THE INVENTION

1. Field of the Invention

The present invention relates to a transmitter/receiver for radio communication using an amplitude demodulation method, an RFID system which uses this transmitter/receiver for radio communication as a RFID reader/writer, and a receiving method for this transmitter/receiver for radio communication.

2. Related Background Art

In an RFID system, information stored in an RFID tag can be read or information can be written to an RFID tag, using an RFID reader/writer (transmitter/receiver for radio communication). For example, an RFID reader/writer sends a command signal to an RFID tag, and the RFID tag replies with a response signal to this command signal. Receiving this response signal, the RFID reader/writer performs a processing corresponding to the response signal (e.g. above mentioned reading information or writing information).

In an RFID tag, a load modulation system is widely used as a response signal reply system. According to the load modulation system, an RFID reader/writer sends an unmodulated transmission signal via an antenna, and an RFID tag side switches load impedance connected to the antenna in the RFID tag so as to change the conditions of reflection from the antenna of the RFID tag, and in result, an amplitude change, generated in an antenna circuit of the RFID reader/writer, is detected. Therefore in the RFID reader/writer, an amplitude demodulation system is used to demodulate the response signal from the RFID tag.

This type of RFID reader/writer is explained in the "RFID Handbook", Second Edition, written by Klaus Finkenzeller, translated by Software Engineering Research Center, Nihon Kogyo Shimbum Co., May 31, 2004, p. 287, FIG. 11, FIG. 16. This RFID reader/writer, which performs amplitude demodulation using a diode, demodulates a superimposed signal of the transmission signal of the reader/writer and the receive signal from the RFID tag.

However, using the RFID reader/writer described in the "RFID Handbook", Second Edition, written by Klaus Finkenzeller, translated by the Software Engineering Research Center, Nihon Kogyo Shimbum Co., May 31, 2004, p. 287, FIG. 11 and FIG. 16, a communication null phenomena may occur under specific conditions. For example, depending on a specific distance condition between the RFID reader/writer and the RFID tag, the RFID reader/writer may not be able to demodulate the response signal from the RFID tag, even if this response signal has sufficient intensity.

SUMMARY OF THE INVENTION

With the foregoing in view, it is an object of the present, invention to provide a transmitter/receiver for radio communication, an RFID system and a method for the transmitter/receiver for radio communication, which allow demodulation of receive signals appropriately even if a communication null phenomena occurs.

In the result of experiments, the present inventors discovered that the phase shift amount of a receive signal, with respect to a transmission signal in an antenna circuit of an RFID reader/writer, differs depending on the different load conditions when an RFID tag performs load modulation. Therefore when the RFID reader/writer superimposes its own transmission signal and a receive signal from the RFID tag, the transmission signal and the receive signal weaken each other, and when a communication null phenomena occurs, the amplitude difference of modulation components in the superimposed signal of the transmission signal and the receive signal disappears.

To solve this problem, a first transmitter/receiver for radio communication of the present invention comprises (a) a transmission circuit for generating a transmission signal, (b) a demodulation circuit for demodulating a receive signal, (c) an antenna circuit for transmitting the transmission signal from the transmission circuit, and receiving the receive signal and guiding the receive signal to the demodulation circuit, (d) a phase shift circuit which is connected between the transmission circuit and the antenna circuit, and (e) a switching circuit which switches between outputting a superimposed signal of the transmission signal and the receive signal between the phase shift circuit and the antenna circuit to the demodulation circuit, and outputting a superimposed signal of the transmission signal and the receive signal between the transmission circuit and the phase shift circuit to the demodulation circuit.

According to this first transmitter/receiver for radio communication, the phase shift circuit shifts the phase of the transmission signal and the phase of the receive signal, so the phase relationship of the transmission signal and the receive signal differs between one end of the phase shift circuit and the other end thereof And the switching circuit can switch outputting the superimposed signal at one end of the phase shift circuit to the demodulation circuit, or outputting the superimposed signal at the other end of the phase shift circuit to the demodulation circuit, so even if a communication null phenomena, in which the amplitude difference of the modulation components of the superimposed signal disappears at one end of the phase shift circuit, occurs, the connection of the demodulation circuit can be switched to the other end, of which phase relationship is different from the one end, by the switching circuit, whereby the receive signal can be appropriately demodulated.

A second transmitter/receiver for radio communication of the present invention comprises (a) a transmission circuit for generating a transmission signal, (b) a demodulation circuit for demodulating a receive signal, (c) an antenna circuit for transmitting the transmission signal from the transmission circuit, and receiving the receive signal and guiding the receive signal to the demodulation circuit, (d) a phase shift circuit which is disposed between the transmission circuit and the antenna circuit, and (e) a switching circuit which switches between connecting the transmission circuit and the demodulation circuit to the antenna circuit not via the phase shift circuit, and connecting the transmission circuit and the demodulation circuit to the antenna circuit via the phase shift circuit.

According to this second transmitter/receiver for radio communication, the phase shift circuit shifts the phase of the transmission signal and the phase of the receive signal, so the phase relationship of the transmission signal and the receive signal can be changed. In other words, the phase shift circuit can change from a state where the amplification difference of the modulation components of the superimposed signal does not exist to a state where the amplification difference exists.

According to this second transmitter/receiver for radio communication, the switching circuit can switch whether the phase shift circuit is inserted or not when the transmission circuit and the demodulation circuit are connected to the antenna circuit, so even if a communication null phenomena occurs, the connection of the demodulation circuit can be switched by the switching circuit, whereby the receive signal can be appropriately demodulated.

A third transmitter/receiver for radio communication of the present invention comprises (a) a transmission circuit for generating a transmission signal, (b) an antenna circuit for transmitting the transmission signal from the transmission circuit, and receiving the receive signal and guiding the receive signal to the transmission circuit side, (c) a phase shift circuit which is connected between the transmission circuit and the antenna circuit, (d) a first demodulation circuit which is connected to a node between the phase shift circuit and the antenna circuit, (e) a second demodulation circuit which is connected to a node between the transmission circuit and the phase shift circuit, and (f) a switching circuit which switches between outputting a demodulation signal from the first demodulation circuit, and outputting a demodulation signal from the second demodulation circuit.

According to this third transmitter/receiver for radio communication, the phase shift circuit shifts the phase of the transmission signal and the phase of the receive signal, so the phase relationship of the transmission signal and the receive signal differs between one end of the phase shift circuit and the other end thereof. As a result, even if a communication null phenomena occurs in the first demodulation circuit for demodulating the superimposed signal at one end of the phase shift circuit, the communication null phenomena does not occur in the second demodulation circuit for demodulating the superimposed signal at the other end of the phase shift circuit. On the other hand, even if the communication null phenomena occurs in the second demodulation circuit for demodulating the superimposed signal at the other end of the phase shift circuit, the communication null phenomena does not occur in the first demodulation circuit for demodulating the superimposed signal at the one end side of the phase shift circuit.

According to the third transmitter/receiver for radio communication, the switching circuit can switch outputting the demodulation signal from the first demodulation circuit, or outputting the demodulation signal from the second demodulation circuit, so even if a communication null phenomena occurs, the connection of the demodulation circuit can be switched by the switching circuit, whereby the receive signal can be appropriately demodulated.

It is preferable that the first or the third transmitter/receiver for radio communication further comprises a matching circuit connected between the transmission circuit and the antenna circuit, wherein a part of the matching circuit or the matching circuit is also used as the phase shift circuit. If the frequency of a transmission/reception signal is high, impedance matching must be performed between the transmission circuit and the antenna circuit so as to decrease signal loss. According to this configuration, a part or all of the matching circuit for impedance matching is also used as the phase shift circuit, so the device can be downsized and price thereof can be decreased.

It is preferable that a phase shift amount of the above mentioned phase shift circuit is (2N−1) times of 45 degrees of a carrier wave in the transmission signal (N is a positive integer)±15 degrees. Every time the phase is shifted by a 45 degree phase shift amount in the phase shift circuit, the amplitude difference becomes zero and the maximum, and between these [zero and maximum values], the amplitude difference gradually increases or decreases. Because of this, in the case of a carrier wave under load condition 1 and a carrier wave under load condition 2, the amplitude difference becomes the maximum if the phase at which the amplitude difference does not exist is shifted by 45 degrees multiplied by (2N−1) (that is, multiplied by an odd number). Even if the phase is shifted±15 degrees from the state in which the amplitude difference is the maximum, a sufficient modulation amplitude difference can be acquired. Therefore the receive signal can be more appropriately demodulated.

The above mentioned receive signal is generated by a load modulation system, and the above mentioned demodulation circuit or the first and second demodulation circuits use an amplitude demodulation system.

It is preferable that the above mentioned first to third transmitter/receiver for radio communication further comprises a control circuit for having the switching circuit perform switching when a demodulation signal from the demodulation circuit cannot be recognized within a predetermined time. According to this configuration, the communication null phenomena can be detected or bypassed independently.

In the above mentioned first to third transmitter/receiver for radio communication, it is preferable that the switching circuit is switched so as to select a greater amplitude demodulation signal. According to this, identification accuracy in a state where the communication null phenomena does not occur can be improved.

It is also preferable that the above mentioned first to third transmitter/receiver for radio communication further comprises a control circuit which causes the switching circuit to perform switching repeatedly, and causes the switching circuit to stop switching when a demodulation signal for the demodulation circuit can be recognized. According to this configuration, the communication null phenomena can be detected and bypassed independently. Since the switching of the switching circuit can be controlled depending on whether the preamble part of a response signal can be recognized, the time required for detecting and bypassing the communication null phenomena can be decreased.

An RFID system of the present invention comprises an RFID reader/writer which uses one of the above mentioned first to third transmitters/receivers for radio communication, and an RFID tag which replies with a response signal to the RFID reader/writer according to a command signal from the RFID reader/writer.

According to this RFID system, one of the above mentioned first to third transmitters/receivers for radio communication is used as an RFID reader/writer, so even if a communication null phenomena occurs, a receive signal can be demodulated appropriately by switching the connection of the demodulation circuit using the switching circuit.

A first receiving method for a transmitter/receiver for radio communication of the present invention is a receiving method for a transmitter/receiver for radio communication which is provided with a transmission circuit for generating a transmission signal, a demodulation circuit for demodulating a receive signal, and an antenna circuit for transmitting the transmission signal from the transmission circuit, and receiving the receive signal and guiding the receive signal to the demodulation circuit, the method comprising the steps of: shifting a phase of the receive signal when a demodulation signal from the demodulation circuit cannot be recognized within a predetermined time; and demodulating a superimposed signal of the phase-shifted receive signal and transmission signal in the demodulation circuit.

According to the first receiving method for the transmitter/receiver for radio communication, if a demodulation signal from the demodulation circuit cannot be recognized within a predetermined time, a phase of the receive signal is shifted and a superimposed signal of the phase-shifted receive signal and transmission signal is demodulated, so the state where the amplitude difference of modulation components of the superimposed signal does not exist can be changed to a state where the amplitude difference exists. Therefore if the communication null phenomena occurs, the receive signal can be demodulated appropriately by shifting the phase of the receive signal.

A second receiving method for a transmitter/receiver for radio communication of the present invention is a receiving method for a transmitter/receiver for radio communication which is provided with a transmission circuit for generating a transmission signal, a demodulation circuit for demodulating a receive signal, and an antenna circuit for transmitting the transmission signal from the transmission circuit, and receiving the receive signal and guiding the receive signal to the demodulation circuit, the method comprising the steps of: performing repetitive demodulation which alternately repeats demodulation of a superimposed signal of a transmission signal and a receive signal, and demodulation of a superimposed signal of a phase-shifted receive signal and transmission signal in the demodulation circuit; and stopping the repetitive demodulation when a demodulation signal from the demodulation circuit can be recognized in the demodulation circuit.

According to the second receiving method for the transmitter/receiver for radio communication, the demodulation circuit performs repetitive demodulation which alternately repeats demodulation of a superimposed signal of a transmission signal and a receive signal and demodulation of a superimposed signal of a phase-shifted receive signal and transmission signal, so in either demodulation, demodulation in a state where the amplitude difference of the modulation components of the superimposed signal exists, can be performed. If the demodulation signal from the demodulation circuit can be recognized, the demodulation circuit stops the repetitive demodulation, so even if a communication null phenomena is generated, the receive signal can be demodulated appropriately in a state where the communication null phenomena does not occur.

DESCRIPTION OF THE PREFERRED EMBODIMENTS

Preferred embodiments of the present invention will now be described with reference to the drawings. In each drawing, identical composing elements or corresponding elements are denoted with the same reference symbols.

First Embodiment

Figure 1:
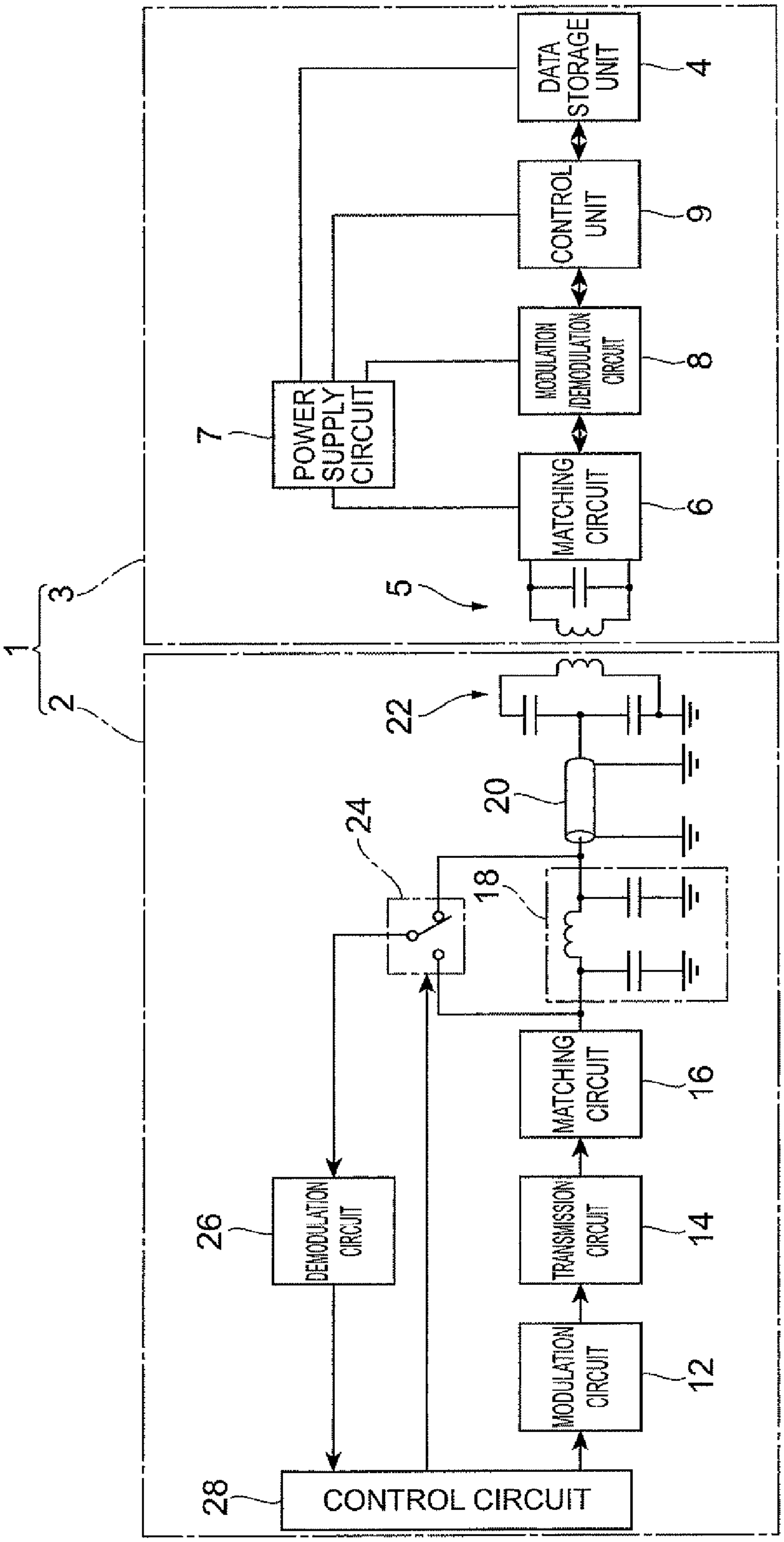
FIG. 1 is a circuit diagram depicting an RFID system and an RFID reader/writer according to a first embodiment of the present invention.

FIG. 1 is a current diagram depicting an RFID system and an RFID reader/writer according to a first embodiment of the present invention. The RFID system 1 in FIG. 1 comprises an RFID reader/writer 2 and an RFID tag 3. The RFID tag 3 further comprises a data storage unit 4, such as a memory, and this data storage unit 4 can store data, such as ID data, product codes, management codes and management number of visitors. This data is read or written by the RFID reader/writer 2. Specifically, the RFID reader/writer 2 sends a command signal to the RFID tag 3 by radio, and the RFID tag 3 replies with a response signal to this command signal. Receiving this response signal, the RFID reader/writer 2 executes processing corresponding to the response signal (e.g. above mentioned data read, data write).

The RFID tag 3 comprises an antenna circuit 5, matching circuit 6, power supply circuit 7, modulation/demodulation circuit 8, control unit 9, and data storage unit 4. The antenna circuit 5 has a coil for an antenna, and a capacitor for resonation, and is connected to the power supply circuit 7 and the modulation/demodulation circuit 8 via the matching circuit 6. The matching circuit 6 is a matching circuit for adjusting the impedance of the power supply circuit 7, modulation/demodulation circuit 8 and the antenna circuit 5, and the power circuit 7 generates DC power by rectifying a carrier wave in a command signal, and supplies this DC power to the modulation/demodulation circuit 8, control unit 9 and data storage unit 4. The modulation/demodulation circuit 8 has a modulation circuit and a demodulation circuit. The demodulation circuit demodulates a command signal. The control unit 9 identifies and analyzes the demodulated command signal.

The control unit 9 also generates a response signal from the data stored in the data storage unit 4 according to the analysis result. The modulation circuit in the modulation/demodulation circuit 8 changes the impedance of the matching circuit 6 according to this response signal. In this way, the reflectance of the matching circuit 6 with respect to the carrier wave from the RFID reader/writer 2 is changed, and a load-modulated response signal is replied to the RFID reader/writer 2.

Now the RFID reader/writer of the first embodiment of the present invention will be described. The RFID reader/writer 2 comprises a modulation circuit 12, transmission circuit 14, matching circuit 16, phase shift circuit 18, coaxial cable 20, antenna circuit 22, switching circuit 24, demodulation circuit 26 and control circuit 28.

The modulation circuit 12 generates a modulation signal based on a control signal from the control circuit 28, and outputs it to the transmission circuit 14.

The transmission circuit 14 generates a command signal (transmission signal) by modulating a carrier wave by the modulation signal. For example, the transmission circuit 14 has a local oscillator for generating a carrier wave, and generates a command signal by modulating this carrier wave by the modulation signal from the modulation circuit 12. The transmission circuit 14 outputs this command signal to the antenna circuit 22 via the matching circuit 16, phase shift circuit 18 and coaxial cable 20.

The matching circuit 16 is disposed for matching the impedance of the transmission circuit 14 and the phase shift circuit 18, and the coaxial cable 20 is disposed to transfer power between the phase shift circuit 18 and the antenna circuit 22. The antenna circuit 22 has a coil for the antenna and a capacitor for matching, and constitutes a resonance circuit to increase high frequency power transfer efficiency. The phase shift circuit 18 will be described later.

In this way, a command signal for reading information is issued from the RFID reader/writer 2 to the RFID tag 3.

When the response signal (receive signal) from the RFID tag 3 is received via the antenna circuit 22, the RFID reader/writer 2 guides the response signal to the phase shift circuit 18 via the coaxial cable 20.

The phase shift circuit 18 shifts the phase of the receive signal from the antenna circuit 22, and also shifts the phase of the command signal from the transmission circuit 14. For example, the phase shift circuit 18, along with an inductor and a capacitor, constitute the π type filter, and the phase shift delay amount of the phase shift circuit 18 is preferably 45 degrees (±15 degrees). The switching circuit 24 is connected between both ends of the phase shift circuit 18 and the demodulation circuit 26.

The switching circuit 24 switches outputting a superimposed signal of a transmission signal (carrier wave only) and a response signal at one end of the phase shift circuit 18 to the demodulation circuit 26, or outputting a superimposed signal of a transmission signal (carrier wave only) and a response signal at the other end of the phase shift circuit 18 to the demodulation circuit 26 according to a switching signal from the control circuit 28. In other words, the switching circuit 24 switches outputting a superimposed signal between the phase shift circuit 18 and the antenna circuit 22 to the demodulation circuit 26, or outputting a superimposed signal between the transmission circuit 14 and the phase shift circuit 18 to the demodulation circuit 26.

The demodulation circuit 26 generates a demodulation signal by demodulating a superimposed signal of a transmission signal (carrier wave only) and a response signal, and outputs the demodulation signal to the control circuit 28.

The control circuit 28 outputs a control signal for reading information to the modulation circuit 12, and issues a command signal. When a demodulation signal from the demodulation circuit 26 is analyzed and the demodulation signal can be recognized, the control circuit 28 executes processing for this demodulation signal, that is, a response signal from the RFID tag 3 (e.g. above mentioned data read and data write). If the demodulation signal cannot be recognized within a predetermined time, the control circuit 28 has the switching circuit 24 switch the connection by a switching signal, and outputs a control signal for reading information again to the modulation circuit 12, and issues a command signal.

In the RFID system, the time from the RFID reader/writer issuing a command signal to the RFID tag replying with a response signal is specified. The predetermined time in the control circuit 28 can be set according to this time.

Now the operation of the RFID reader/writer 2 and the RFID system 1 of the first embodiment will be described, and the receiving method of the RFID reader/writer according to the first embodiment of the present invention will also be described.

First the RFID reader/writer 2 issues a command signal for reading information to the RFID tag 3. Specifically, the control circuit 28 outputs a control signal for the reading operation to the modulation circuit 12, and the modulation circuit 12 generates a modulation signal according to this control signal, and outputs [the modulation signal] to the transmission circuit 14. The transmission circuit 14 generates a command signal by modulating a carrier wave by this modulation signal. This command signal is transmitted from the antenna circuit 22 via the matching circuit 16, phase shift circuit 18 and coaxial cable 20. When issuing the command signal ends, the RFID reader/writer 2 continues outputting only the carrier wave.

Then the RFID tag 3 replies with a response signal to the RFID reader/writer 2 according to this command signal. Specifically, the power supply circuit 7 generates DC power from the carrier wave in the command signal, and supplies [the DC power] to the modulation/demodulation circuit 8, control unit 9 and data storage unit 4. Then the modulation/demodulation circuit 8 demodulates the command signal to identify and analyze, and the control unit 9 generates the response signal from the data stored in the data storage unit 4 according to the analysis result. The modulation/demodulation circuit 8 changes the impedance of the matching circuit 6 according to this response signal. In this way, the reflectance of the matching circuit 6 with respect to the carrier wave from the RFID reader/writer 2 is changed, and the load-modulated response signal is replied to the RFID reader/writer 2.

Then the RFID reader/writer 2 demodulates and recognizes this response signal. Specifically, according to the control signal from the control circuit 28, the switching circuit 24 connects one end of the phase shift circuit 18 and the demodulation circuit 26. To this one end of the phase shift circuit 18, the response signal received by the antenna circuit 22 is guided via the coaxial cable 20, and also the carrier wave of the transmission signal, which is output from the transmission circuit 14, is guided via the matching circuit 16 and the phase shift circuit 18. And at this one end of the phase shift circuit 18, a superimposed signal, generated by superimposing the carrier wave of the transmission signal and the response signal, is demodulated by the demodulation circuit 26, and a demodulation signal is output to the control circuit 28. The control circuit 28 can recognize the response signal from this demodulation signal.

To the other end of the phase shift circuit 18, the carrier wave of the transmission signal, which is output from the transmission circuit 14, is guided via the matching circuit 16, and the response signal received by the antenna circuit 22 is guided via the coaxial cable 20 and the phase shift circuit 18. And at this other end of the phase shift circuit 18, a superimposed signal is generated by superimposing the carrier wave of the transmission signal and the response signal.

When the response signal can be recognized from the demodulation signal, the control circuit 28 executes processing for the response signal (e.g. data read and data write). Whereas when the response signal cannot be recognized from the demodulation signal within a predetermined time, the control circuit 28 has the switching circuit 24 switch the connection using a switching signal. Then the control circuit 28 attempts to issue the above mentioned command signal for reading information again.

Now the functional effects of the RFID reader/writer 2 and the RFID system 1 of the first embodiment will be described. As a result of experiments, the present inventors discovered that a communication null phenomena is generated by:

(1) In the case of the load modulation system, Q values of the antenna circuit 5 and the matching circuit 6 in the RFID tag 3 differs between load conditions 1 and load conditions 2, which are different.

(2) The response frequency of the antenna circuit 5 in the RFID tag 3 is shifted from the frequency of the carrier wave from the RFID reader/writer 2, for the purpose of bypassing the influence of collision which may occur, when the other RFID tags coexist.

Figure 2:
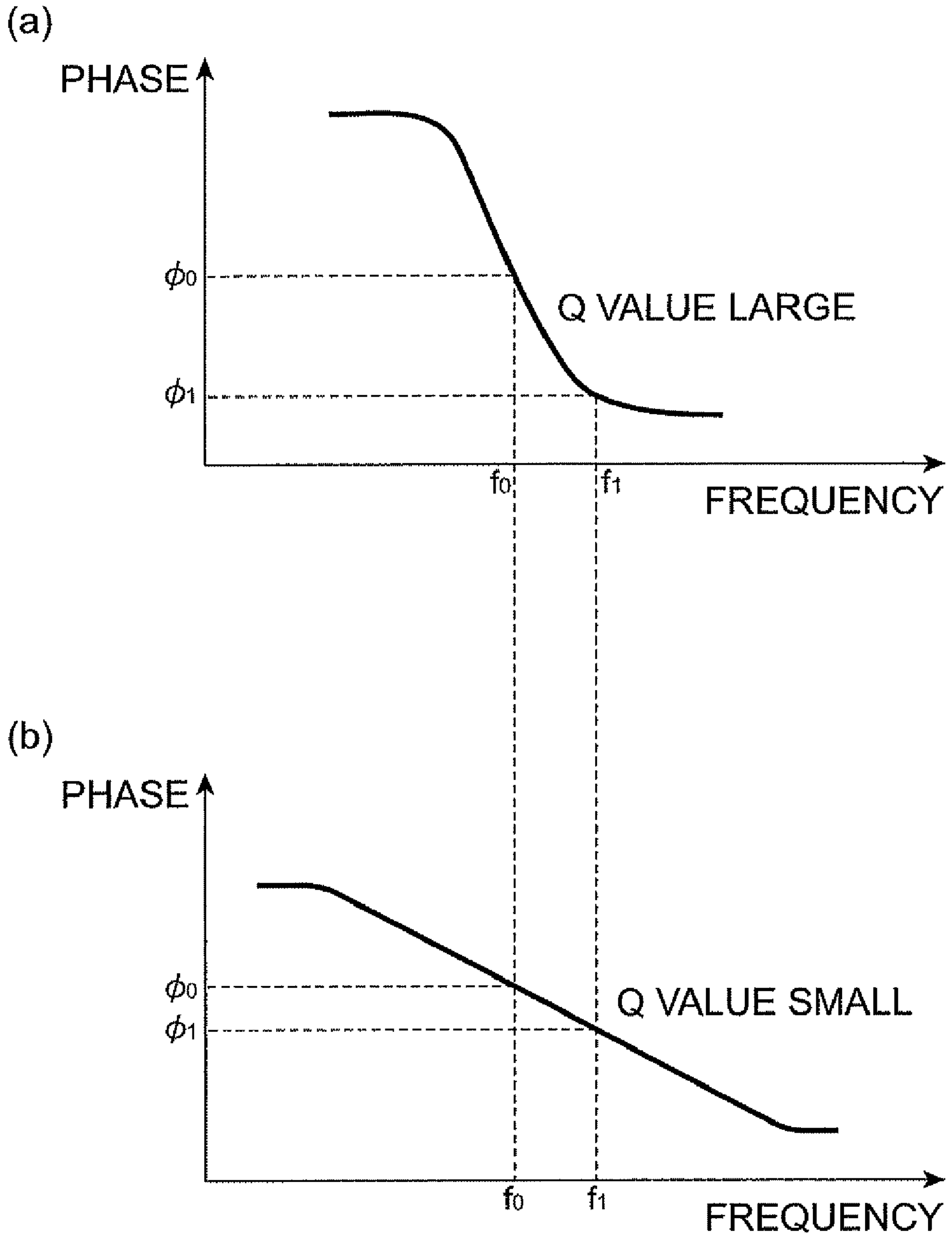
FIG. 2 are graphs showing a phase of a carrier wave with respect to a resonance frequency of an antenna circuit.
Figure 3:
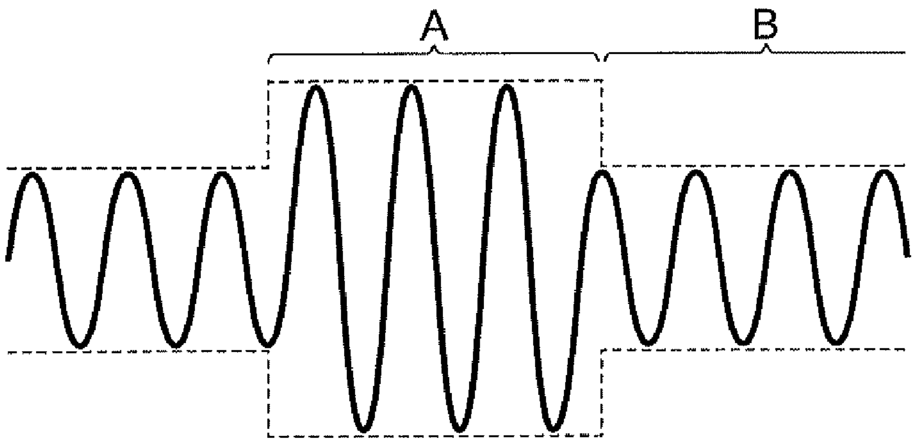
FIG. 3 is a diagram depicting a load modulation signal.

FIG. 2 are graphs showing a phase of a response reflection wave with respect to the resonance frequency of the antenna circuit, and FIG. 3 is a diagram showing a load modulation signal. (a) of FIG. 2 shows a phase of a response reflection wave when the Q values of the antenna circuit 5 and the matching circuit 6 are large, and (b) of FIG. 2 shows a phase of a response reflection wave when the Q values of the antenna circuit 5 and the matching circuit 6 are small.

According to FIG. 2, in the case when the resonance frequency f1 of the antenna circuit 5 is shifted from the frequency f0 of the carrier wave of the transmission signal, the phase shift amount Φ 0-Φ 1 of the response reflection wave is larger as the Q values of the antenna circuit 5 and the matching circuit 6 is larger. This means that in the load modulation signal shown in FIG. 3, the phase shift amount of the response reflection wave is small under load conditions 1 (range A), and the phase shift amount of the response reflection wave is large under load conditions 2 (range B). In other words, in the response signal, the phase of the response reflection wave differs between ranges A and B where the modulation amplitude difference differs.

Figure 4:
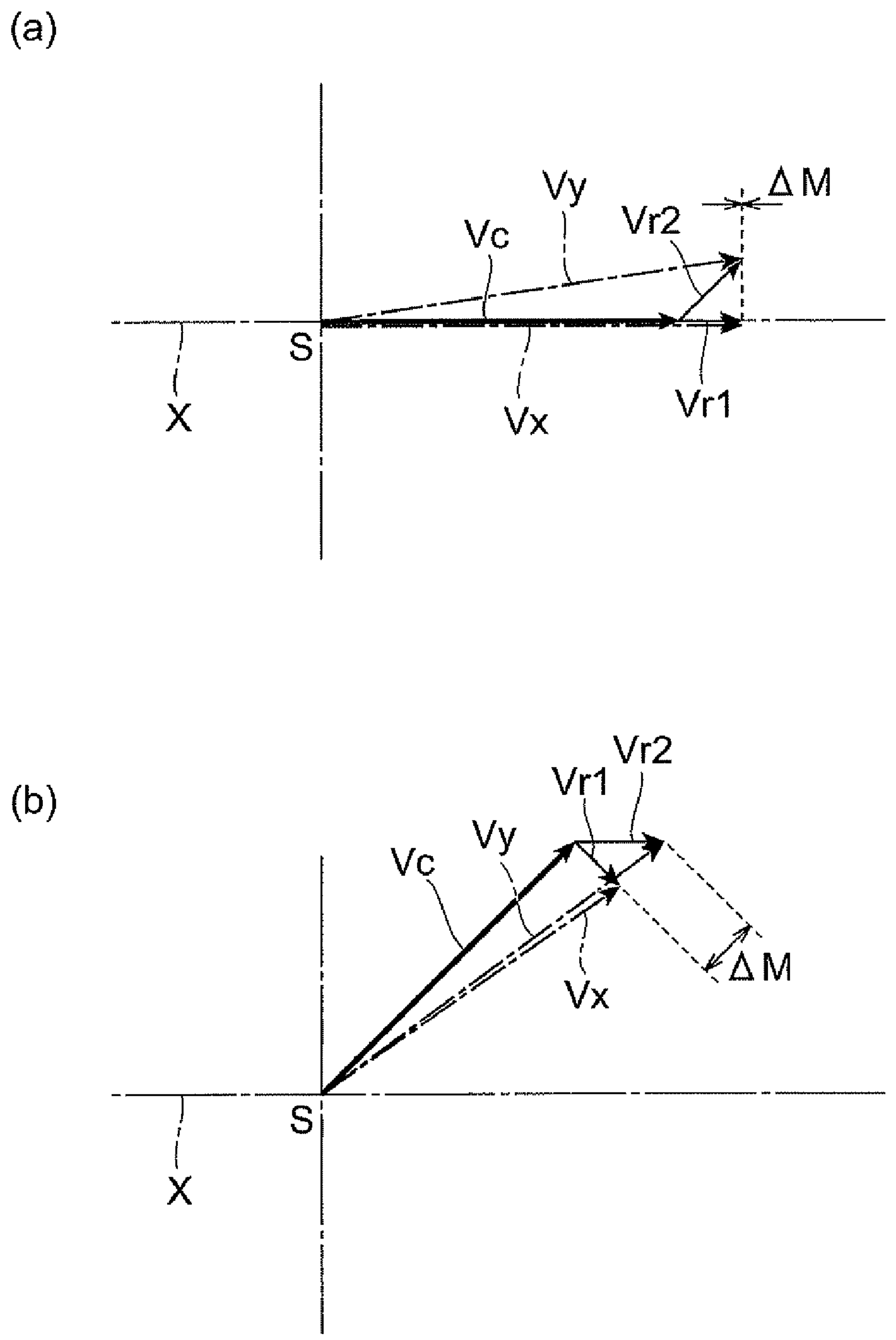
FIG. 4 are graphs showing a superimposed signal to be input to a demodulation circuit, and shows a superimposed signal by vectors, when the modulation amplitude difference does not exist in one end of a phase shift circuit.

FIG. 4 are diagrams depicting a superimposed signal which is input to the demodulation circuit and which is in a state when the modulation amplitude difference does not exist at one end of the phase shift circuit. (a) of FIG. 4 shows a superimposed signal at one end of the phase shift circuit 18, and (b) of FIG. 4 shows a superimposed signal at the other end of the phase shift circuit 18.

In FIG. 4, the distance from the origin S indicates the amplitude of the superimposed signal, and the angle from the reference axis X indicates the phase angle. The vector Vc indicates the carrier wave of the transmission signal, and the vectors Vr1 and Vr2 show the response reflection wave (carrier wave) under load conditions 1 and the response reflection wave (carrier wave) under load conditions 2 in the response signal respectively.

(a) of FIG. 4 is an example when the phase shift amount of the vector Vr2 is larger then the vector Vr1 and the modulation amplitude distance ΔM of the superimposed signal is smaller at one end of the phase shift circuit 18 because of the above mentioned cases (1) and (2). In other words, the phase shift amount of the response reflection wave under load conditions 2 is larger compared with the response reflection wave under load conditions 1. As a result, the size of the composite vector Vx of the vector Vc and vector Vr1 and the size of the composite vector Vy of the vector Vc and the vector Vr2 have no difference. In other words, the modulation amplitude difference ΔM of the superimposed signal does not exist in one end of the phase shift circuit 18.

In this case, the traveling direction of the transmission signal with respect to the phase shift circuit 18 is opposite from the traveling direction of the response signal, so the phase of the transmission signal at the other end of the phase shift circuit 18 advances 45 degrees from the phase of the transmission signal of the one end of phase shift circuit 18, and the phase of the response signal at the other end of the phase shift circuit 18 delays 45 degrees from the phase of the response signal at the one end of the phase shift circuit 18. As a result, as (b) of FIG. 4 shows, the vector Vc and the vectors Vr1 and Vr2 shift in opposite directions of the phase angle direction, and the relative phase difference change between both ends of the phase shift circuit 18 becomes 90 degrees, whereby the amplitude change direction of the superimposed signal, due to the phase change of the response reflection wave in the superimposed signal, can be changed.

Therefore as (b) of FIG. 4 shows, the difference between the size of the composite vector Vx of the vector Vc and vector Vr1 and the size of the composite vector Vy of the vector Vc and vector Vr2 increases at the other end of the phase shift circuit 18. In other words, the modulation amplitude difference ΔM of the superimposed signal at the other end of the phase shift circuit 18 increases.

According to FIG. 4, even if the communication null phenomena appears at one end of the phase shift circuit 18, the change of the amplitude and the phase of the response reflection wave increases the change of the superimposed signal at the other end of the phase shift circuit 18, so the amplification modulation of the response signal from the RFID tag 3 becomes possible.

Now an ideal state where the resonance frequency of the antenna circuit 5 in the (2') RFID tag 3 matches the frequency of the carrier wave from the RFID reader/writer 2 will be described with reference to FIG. 5.

Figure 5:
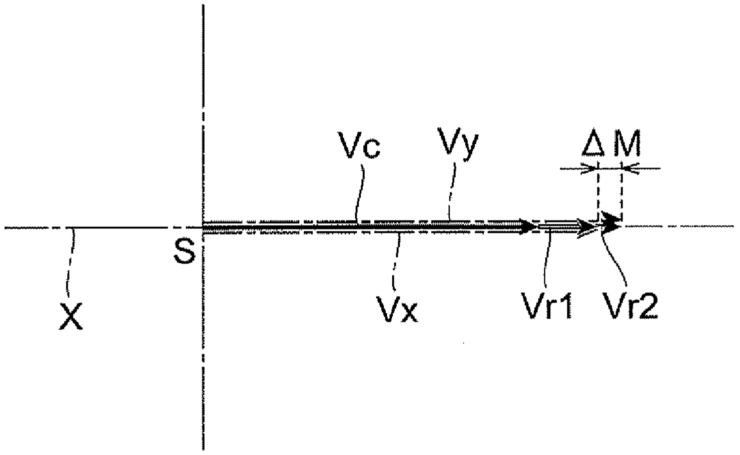
FIG. 5 are graphs showing a superimposed signal to be input to the demodulation circuit, and shows a superimposed signal in an ideal state by vectors.
Figure 5:
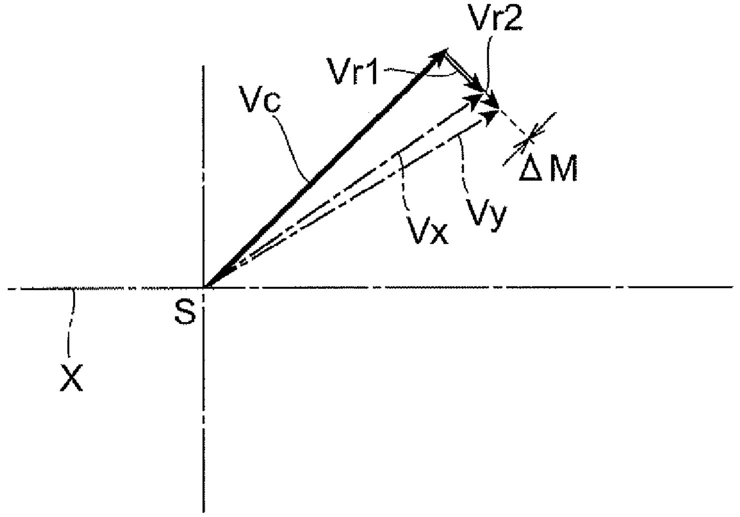

FIG. 5 are diagrams showing a superimposed signal which is input to the demodulation circuit and which is in an ideal state, using vectors. (a) of FIG. 5 shows a superimposed signal at one end of the phase shift circuit 18, and (b) of FIG. 5 shows a superimposed signal at the other end of the phase shift circuit 18.

In FIG. 5, the distance from the origin S indicates the amplitude of the superimposed signal, and the angle from the reference axis X indicates the phase angle. The vector Vc indicates the carrier wave of the transmission signal, and the vectors Vr1 and Vr2 show the response reflection wave (carrier wave) under load conditions 1 and the response reflection wave (carrier wave) under load conditions 2 in the response signal respectively.

(a) of FIG. 5 is an example when there is no phase shift between the carrier wave and the vector Vr1 and vector Vr2 at one end of the phase shift circuit 18 respectively. In other words, there is no phase shift of the response reflection wave under load conditions 1 and the response reflection wave under load conditions 2 with respect to the carrier wave. As a result, there is a difference between the size of the composite vector Vx of the vector Vc and the vector Vr1, and the size of the composite vector Vy of the vector Vc and the vector Vr2. In other words, the modulation amplitude difference ΔM of the superimposed signal exists at one end of the phase shift circuit 18.

In this case, the phase of the transmission signal at the other end of the phase shift circuit 18 advances 45 degrees from the phase of the transmission signal of the one end of the phase shift circuit 18, and the phase of the response signal at the other end of the phase shift circuit 18 delays 45 degrees from the phase of the response signal at the one end of the phase shift circuit 18. As a result, as (b) of FIG. 5 shows, the vector Vc and vectors Vr1 and Vr2 shift in the opposite directions in the phase angle direction, and the relative phase difference change between both ends of the phase shift circuit 18 becomes 90 degrees, and the direction of amplitude change of the superimposed signal, caused by the phase change of the response reflection wave in the superimposed signal, changes.

Therefore, as (b) of FIG. 5 shows, the size of the composite vector Vx of the vector Vc and the vector Vr1, and the size of the composite vector Vy of the vector Vc and the vector Vr2 have no difference at the other end of the phase shift circuit 18. In other words, the modulation amplitude difference ΔM of the superimposed signal at the other end of the phase shift circuit 18 disappears.

According to FIG. 5, it is preferable to demodulate the superimposed signal at the one end, not the other end, of the phase shift circuit 18 if there is no phase shift of the response reflection wave under load conditions 1 and the response reflection wave under load conditions 2 with respect to the carrier wave. Hence the configuration which allows selecting one of the superimposed signal at one end and the superimposed signal at the other end of the phase shift circuit 18, like the case of the present invention, is preferable.

Figure 6:
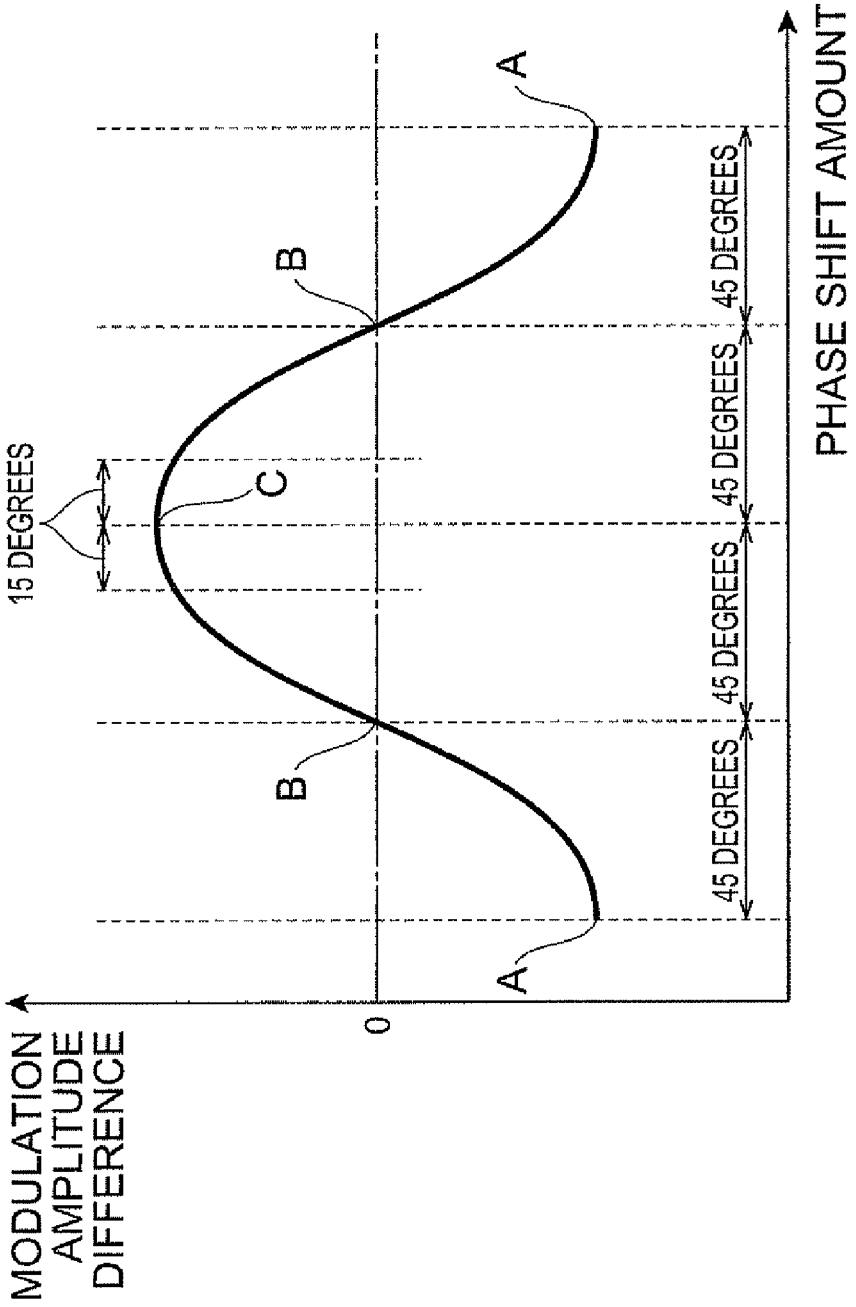
FIG. 6 is a graph depicting the modulation amplitude difference between a superimposed signal under load condition 1, and a superimposed signal under load condition 2 with respect to the phase shift amount of the phase shift circuit.

Now an appropriate phase shift amount in the phase shift circuit 18 is analyzed. FIG. 6 is a diagram depicting the modulation amplitude difference of the superimposed signal under load conditions 1 and superimposed signal under load conditions 2 with respect to the phase shift amount of the phase shift circuit. As FIG. 6 shows, each time the phase shifts by 45 degrees in the phase shift circuit, the modulation amplitude difference ΔM becomes zero and the maximum, and the modulation amplitude difference ΔM gradually increases or decreases between [zero and the maximum]. Therefore the amplitude difference of the response reflection wave under load conditions 1 and the response reflection wave under load conditions 2 becomes the maximum if phase is shifted by 2N−1 times N is a positive integer) of 45 degrees from the state where no amplitude difference exists. In the case of the phase shift amount B, there is no amplitude difference between load conditions 1 and load conditions 2, so a demodulation signal cannot be obtained even if load modulation is performed in the RFID tag. In the case of the phase shift amounts A and C, a demodulation signal can be obtained, but polarities thereof are opposite [between A and C]. But this is no problem because the RFID system normally uses a transmission system where the state transition interval has a meaning and polarity has no meaning (e.g. Manchester modulation).

Even if the phase is ±15 degrees shifted from the state where the modulation amplitude difference ΔM is the maximum, a sufficient modulation amplitude difference can be obtained. Therefore the receive signal can be demodulated even more appropriately.

In this way, according to the RFID reader/writer 2 of the first embodiment and the receiving method for the RFID reader/writer of the first embodiment, the phase shift circuit 18 shifts the phase of the transmission signal and the phase of the receive signal so the phase relationship of the transmission signal and receive signal differs between one end side and the other end side of the phase shift circuit 18. As a result, even if there is no amplitude difference of the modulation components of the superimposed signal at one end of the phase shift circuit 18, for example, the amplitude difference of the modulation components of the superimposed signal still exists at the other end of the phase shift circuit 18. On the other hand, even if there is no amplitude difference of the modulation components of the superimposed signal at the other end of the phase shift circuit 18, the amplitude difference of the modulation components of the superimposed signal still exists at the one end of the phase shift circuit 18.

Also according to the RFID reader/writer 2 of the first embodiment and the receiving method for the RFID reader/writer of the first embodiment, the switching circuit 24 can switch outputting a superimposed signal at one end of the phase shift circuit 18 to the demodulation circuit 26, or outputting a superimposed signal at the other end of the phase shift circuit 18 to the demodulation circuit 26, so even if a communication null phenomena occurs, the switching circuit 24 can switch the connection of the demodulation circuit 26, whereby the receive signal can be appropriately demodulated.

Also according to the RFID reader/writer 2 of the first embodiment and the receiving method for the RFID reader/writer of the first embodiment, the control circuit 28 can independently detect or bypass a communication null phenomena.

Also according to the RFID system 1 of the first embodiment, which uses the RFID reader/writer 2 of the first embodiment, even if a communication null phenomena occurs, the switching circuit 24 can switch the connection of the demodulation circuit 26, whereby the receive signal can be appropriately demodulated.

Second Embodiment

Figure 7:
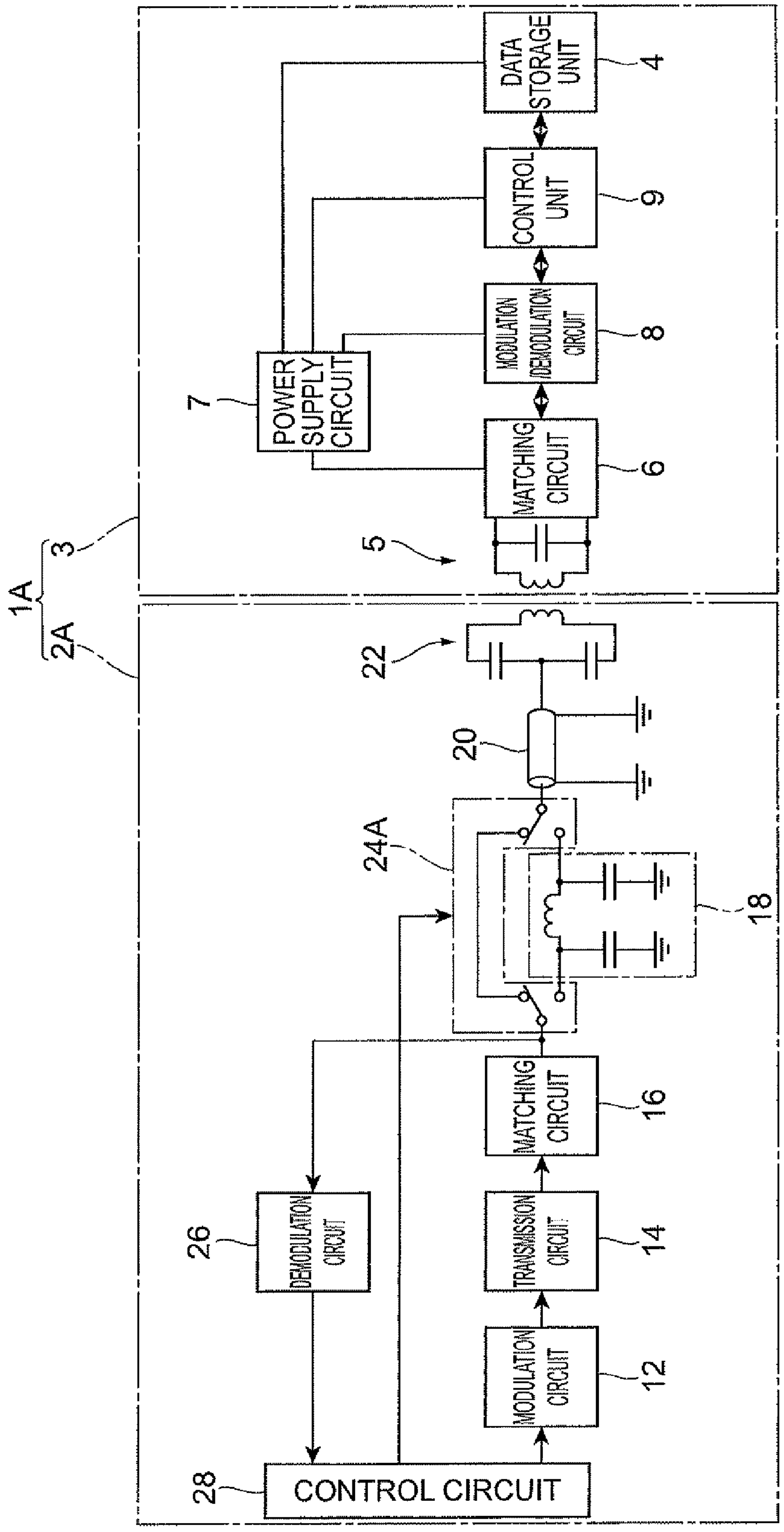
FIG. 7 is a circuit diagram depicting an RFID system and an RFID reader/writer according to the second embodiment of the present invention.

FIG. 7 is a circuit diagram depicting an RFID system and an RFID reader/writer according to a second embodiment of the present invention. The RFID system 1A shown in FIG. 7 has an RFID reader/writer 2A, instead of the RFID reader/writer 2 in the RFID system 1, which is the difference from the first embodiment. The rest of the configuration of the RFID system 1A is the same as the RFID system 1.

The RFID reader/writer 2A of the second embodiment of the present invention has a switching circuit 24A, instead of the switching circuit 24 in the RFID reader/writer 2, which is the difference from the first embodiment. The rest of the configuration of the RFID reader/writer 2A is the same as the RFID reader/writer 2.

The switching circuit 24A switches whether the phase shift circuit 18 is inserted between the matching circuit 16 and the demodulation circuit 26 and the coaxial cable 20 or not, according to a switching signal from the control circuit 28. In other words, the switching circuit 24A switches whether the transmission circuit 14 and the demodulation circuit 26 and the antenna circuit 22 are connected, or the phase shift circuit 18 is connected between the transmission circuit 14 and the demodulation circuit 26 and the antenna circuit 22.

Now operation of the RFID system 1A and the RFID reader/writer 2A of the second embodiment will be described, and also the receiving method for the RFID reader/writer according to the second embodiment of the present invention will be described.

First the RFID reader/writer 2A issues a command signal for reading information to the RFID tag 3, just like the RFID reader/writer 2. When issuing the command signal ends, the RFID reader/writer 2A continues outputting only a carrier wave.

Then according to this command signal, the RFID tag 3 replies with a load-modulated response signal to the RFID reader/writer 2, as mentioned above.

Then just like the case of the RFID reader/writer 2, the RFID reader/writer 2A demodulates and recognizes this response signal. Specifically, according to a control signal from the control circuit 28, the switching circuit 24A connects the transmission circuit 14 and the demodulation circuit 26 and the antenna circuit 22 without passing through the phase shift circuit 18. In the demodulation circuit 26, a superimposed signal, generated by superimposing the response signal received by the antenna circuit 22 to the transmission signal which is output from the transmission circuit 14, is demodulated, and the demodulation signal is output to the control circuit 28. The control circuit 28 recognizes a response signal from this demodulation signal.

If recognition is successful, the control circuit 28 analyzes the data portion coming after the preamble portion of the response signal 28, and executes the processing according to the response signal (e.g. data read, data write). If the recognition fails even if a predetermined time elapses, the control circuit 28 has the switching circuit 24A change the connection state using a switching signal. Specifically, the switching circuit 24A connects the transmission circuit 14 and the demodulation circuit 26 and the antenna circuit 22 via the phase shift circuit 18 according to the control signal from the control circuit 28. Then the control circuit 28 attempts to issue the above mentioned command signal for reading information again.

In this way, in the case of the RFID reader/writer 2A of the second embodiment and the receiving method for the RFID reader/writer of the second embodiment as well, the phase shift circuit 18 shifts the phase of the receive signal, so the phase relationship of the transmission signal and the receive signal can be changed. In other words, the phase shift circuit 18 can change the state where the amplitude difference of the modulation components of the superimposed signal does not exist to the state where the amplitude difference exists.

According to the RFID reader/writer 2A of the second embodiment, the switching circuit 24A can switch whether the phase shift circuit 18 is inserted between the transmission circuit 14 and the demodulation circuit 26 and the antenna circuit 22, so even if the communication null phenomena occurs, the connection of the demodulation circuit 26 can be switched by the switching circuit 24A, whereby the receive signal can be appropriately demodulated.

According to the RFID system 1A of the second embodiment, which uses the RFID reader/writer 2A of the second embodiment, even if a communication null phenomena occurs, the connection of the demodulation circuit 26 can be switched by the switching circuit 24A, whereby the receive signal can be appropriately demodulated.

Third Embodiment

Figure 8:
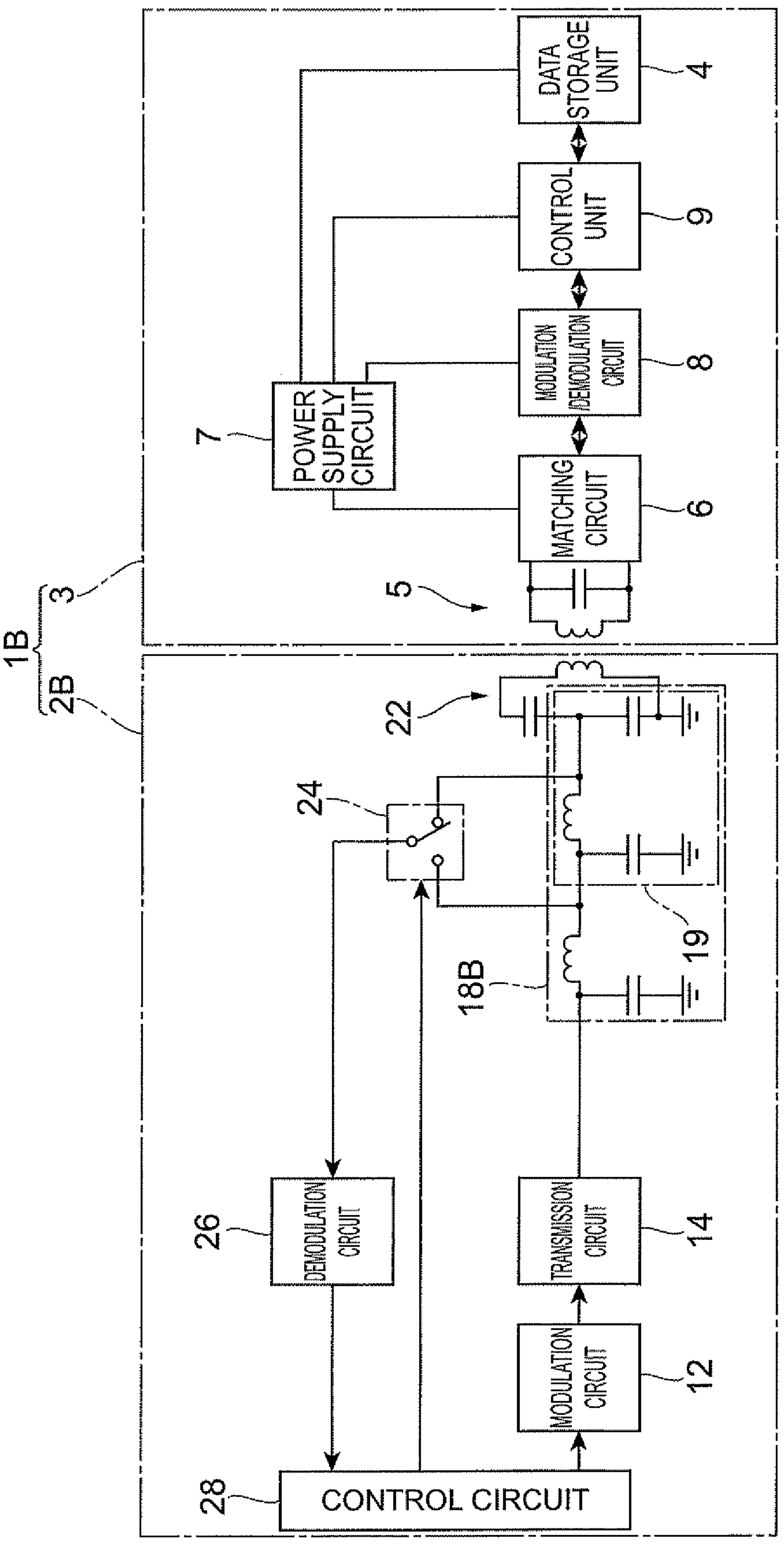
FIG. 8 is a circuit diagram depicting an RFID system and an RFID reader/writer according to the third embodiment of the present invention.

FIG. 8 is a circuit diagram depicting an RFID system and an RFID reader/writer according to the third embodiment of the present invention. The RFID system 1B shown in FIG. 8 has an RFID reader/writer 2B, instead of the RFID reader/writer 2 of the RFID system 1, which is the difference from the first embodiment. The rest of the configuration of the RFID system 1B is the same as the RFID system 1.

The RFID reader/writer 2B according to the third embodiment of the present invention has a matching/phase shift circuit 181B, instead of the matching circuit 16, phase shift circuit 18 and coaxial cable 20, in the RFID reader/writer 2, which is the difference from the first embodiment. The rest of the configuration of the RFID reader/writer 2B is the same as the RFID reader/writer 2.

The matching/phase shift circuit 18B functions as the above mentioned matching circuit and the phase shift circuit. The matching/phase shift circuit 18B constitutes ladder shaped π type LC filters, and one of the LC filters functions as a phase shift circuit 19. One end and the other end of the phase shift circuit 19 are connected to the switching circuit 24 respectively. In the present embodiment, the matching/phase shift circuit 18B and the phase shift circuit 19 share a capacitor with the antenna circuit 22.

The RFID reader/writer 2B of the third embodiment as well has advantages similar to the RFID reader/writer 2 of the first embodiment that can be implemented. Also the RFID system 1B of the third embodiment as well has advantages similar to the RFID system 1 of the first embodiment that can be implemented.

Fourth Embodiment

Figure 9:
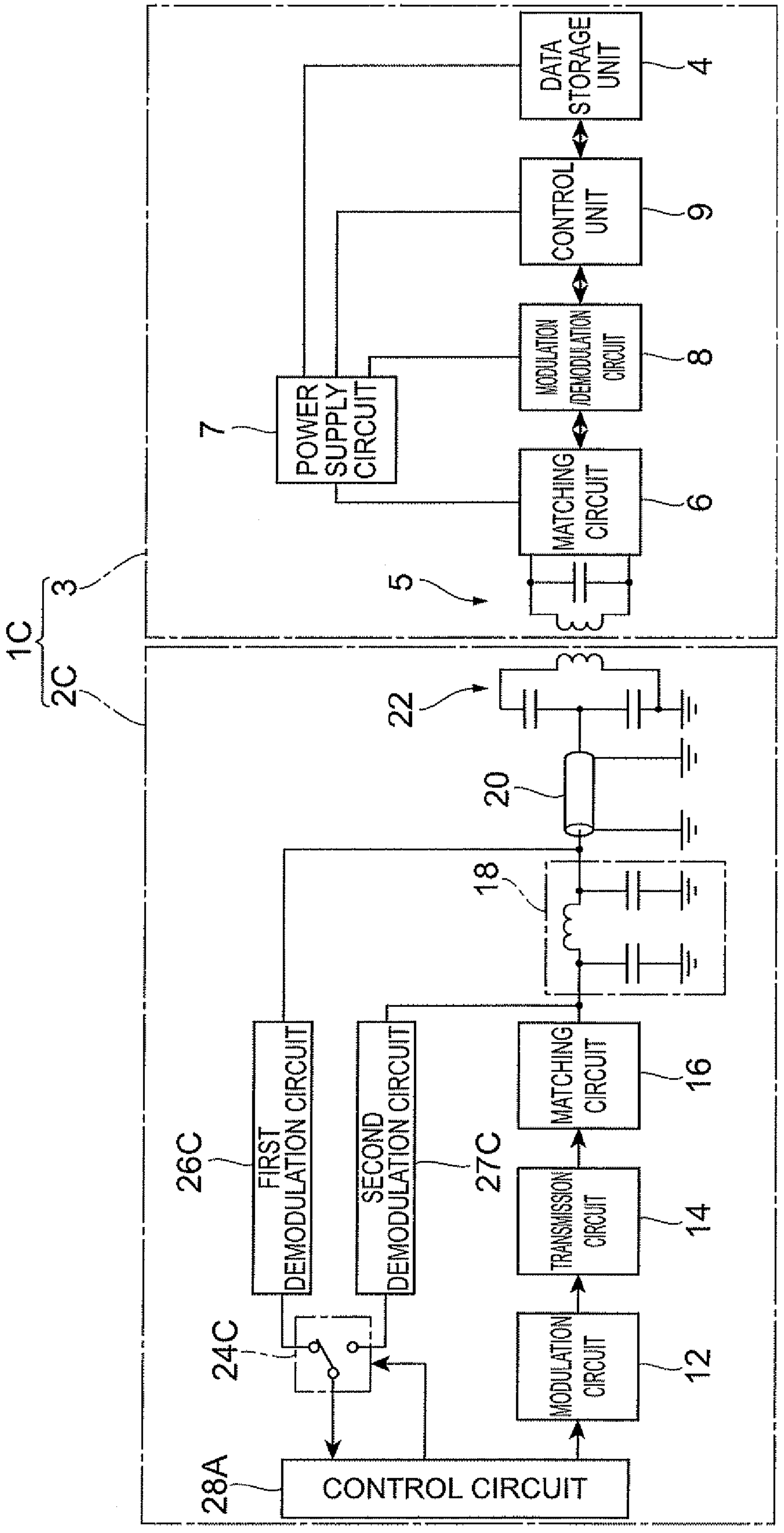
FIG. 9 is a circuit diagram depicting an RFID system and an RFID reader/writer according to the fourth embodiment of the present invention.

FIG. 9 is a circuit diagram depicting an RFID system and an RFID reader/writer according to a fourth embodiment of the present invention. The RFID system 1C shown in FIG. 9 has an RFID reader/writer 2C, instead of the RFID reader/writer 2 in the RFID system 1, which is the difference from the first embodiment. The rest of the configuration of the RFID system 1C is the same as the RFID system 1.

The RFID reader/writer 2C of the fourth embodiment of the present invention has a switching circuit 24C, and the first and second modulation circuits 26C and 27C, instead of the switching circuit 24 and the demodulation circuit 26 in the RFID reader/writer 2, which is the difference from the first embodiment. The RFID reader/writer 2C also has a control circuit 28A, instead of the control circuit 28 in the RFID reader/writer 2, which is the difference from the first embodiment. The rest of the configuration of the RFID reader/writer 2C is the same as the RFID reader/writer 2.

The first demodulation circuit 26C generates a demodulation signal by demodulating a superimposed signal of a command signal and a response signal at one end of the phase shift circuit 18, that is, between the phase shift circuit 18 and the antenna circuit 22. In the same way, the second demodulation circuit 27C generates a demodulation signal by demodulating a superimposed signal of a command signal and a response signal at the other end of the phase shift circuit 18, that is, between the transmission circuit 14 and the phase shift circuit 18. A switching circuit 24C is connected between the first and second demodulation circuits 26C and 27C and the control circuit 28A.

The switching circuit 24C switches outputting the demodulation signal from the first demodulation circuit 26C or outputting the demodulation signal from the second demodulation circuit 27C according to the switching signal from the control circuit 28A.

The control circuit 28A outputs a control signal for reading information to the modulation circuit 12 to have a command signal issued. After the command signal is issued, the control circuit 28A has the switching circuit 24C switch the connection repeatedly by the switching signal, and if either the demodulation signal from the first demodulation circuit 26C or the demodulation signal from the second demodulation circuit 27C can be recognized, [the control circuit 28A] has the switching circuit 24C stop switching the connection using a switching signal. The control circuit 28A executes processing for the demodulation signal, that is, the response signal from the RFID tag 3 (e.g. above mentioned data read or data write).

Now the operation of the RFID system 1C and the RFID reader/writer 2C of the fourth embodiment will be described, and also the receiving method for the RFID reader/writer according to the fourth embodiment of the present invention will be described.

First, the RFID reader/writer 2C issues a command signal for reading information to the RFID tag 3, just like the RFID reader/writer 2. When issuing the command signal ends, the RFID reader/writer 2C continues outputting only a carrier wave. In the RFID reader/writer 2C, the control circuit 28A has the switching circuit 24C switch connection repeatedly by a switching signal. It is preferable that this repetitive switching is performed at an interval shorter than the preamble signal duration time according to protocol.

Then, according to this command signal, the RFID tag 3 replies with a load-modulated response signal to the RFID reader/writer 2C, as mentioned above.

Then, just like the case of the RFID reader/writer 2, the RFID reader/writer 2C demodulates and recognizes this response signal. If a preamble portion of the response signal can be recognized from the demodulation signal, the control circuit 28A has the switching circuit 24C stop switching the connection by a switching signal, and maintain the connection state at the time of the stop. Then the control circuit 28A analyzes the data portion coming after the preamble portion of the response signal, and executes processing according to this response signal (e.g. data read, data write).

If recognition of the response signal fails during communication, the control circuit 28A has the switching circuit 24C switch connection repeatedly using a switching signal, and if the response signal can be recognized from the demodulation signal, [the control circuit 28A] has the switching circuit 24C stop switching the connection using a switching signal, and maintain the connection state at the time of the stop.

If both the demodulation signal from the first demodulation circuit 26C and the demodulation signal from the second demodulation circuit 27C can be recognized when the switching circuit 24C switches the connection, the control circuit 28A has the switching circuit 24C stop the connection switching by a switching signal, so that the demodulation signal of which amplitude is higher is selected, and maintain the connection state at the time of the stop.

A demodulation failure of the response signal occurs either when a communication null phenomena occurs even if the RFID tag 3 exists, or when the RFID tag 3 itself does not exist. When the RFID tag 3 itself does not exist, the control circuit 28A cannot recognize both the demodulation signal from the first demodulation circuit 26C and the demodulation signal from the second demodulation circuit 27C even if the switching circuit 24C is switched. Hence if the demodulation signal cannot be recognized even if the switching circuit 24C is switched for a predetermined time, the control circuit 28A may judge that the RFID tag 3 does not exist, and stop the operation of the RFID reader/writer 2C or operate [the RFID reader/writer 2C] intermittently.

If the signal path is switched before demodulation, a loud noise is generated. Switching before receiving data has no problems, but a problem occurs if switching is performed during a continuous data receiving cycle. In the case of the fourth embodiment, a noise is not generated because [the signal path] is switched after demodulation.

According to the RFID reader/writer 2C of the fourth embodiment, the phase shift circuit 18 shifts the phase of the transmission signal and the phase of the receive signal, so the phase relationship of the transmission signal and receive signal differs between one end and the other end of the phase shift circuit 18. As a result, even if a communication null phenomena occurs in the first demodulation circuit 26C, which demodulates a superimposed signal at one end of the phase shift circuit 18, the communication null phenomena does not occur in the second demodulation circuit 27C, which demodulates a superimposed signal at the other end of the phase shift circuit 18. On the other hand, even if the communication null phenomena occurs in the second demodulation circuit 27C, which demodulates a superimposed signal at the other end of the phase shift circuit 18, the communication null phenomena does not occur in the first demodulation circuit 26C, which demodulates a superimposed signal at the one end of the phase shift circuit 18.

According to the RFID reader/writer 2C of the fourth embodiment, the switching circuit 24C can switch outputting the demodulation signal from the first demodulation circuit 26C, or outputting the demodulation signal from the second demodulation circuit 27C, so even if a communication null phenomena occurs, the connection of the demodulation circuits 26C and 27C can be switched by the switching circuit 24C, whereby the receive signal can be appropriately demodulated.

Also according to the RFID reader/writer 2C of the fourth embodiment and the receiving method for the RFID reader/writer of the fourth embodiment, a communication null phenomena can be detected or bypassed independently. Since switching of the switching circuit 24C can be controlled depending on whether the preamble portion of the response signal can be recognized or not, the time required for detecting or bypassing a communication null phenomena can be decreased.

According to the RFID system 1C of the fourth embodiment, which uses the RFID reader/writer 2C of the fourth embodiment, even if a communication null phenomena occurs, the connection of the demodulation circuits 26C and 27C can be switched by the switching circuit 24C, whereby the receive signal can be appropriately demodulated.

The present invention is not limited to the above mentioned embodiments, but can be modified in various ways.

In the present embodiment, the π type LC filter is used for the phase shift circuit 18 as an example, but various modes that can shift a phase by advance or delay can be applied to the phase shift circuit. For example, the phase shift circuit may be an L type LC filter, π type or L type RC filter, or a transmission line having a desired delay amount. A similar effect can also be obtained by installing two nodes having about a 45 degree phase difference in the impedance matching circuit, connecting an amplitude demodulation circuit respectively to [these nodes] and switching the demodulation signals.

In the third embodiment, an example of the RFID reader/writer 2 of the first embodiment having the matching/phase shift circuit 18B, instead of the matching circuit 16, the phase shift circuit 18 and the coaxial cable 20, was shown, but the RFID reader/writer 2C of the fourth embodiment may have the matching/phase shift circuit 18B, instead of the matching circuit 16, phase shift circuit 18 and coaxial cable 20. In this case, one end and the other end of the phase shift circuit 19 are connected to the first demodulation circuit 26C and the second demodulation circuit 27C respectively.

In the first embodiment, an example of setting the phase shift amount of the phase shift circuit to an odd multiple of 45 degrees and switching between two superimposed signals having different phase relationships of the transmission signal and the receive signal was shown, but the maximum modulation amplitude difference is not always obtained, depending on the conditions. In order to obtain a superimposed signal having a value close to the maximum modulation amplitude difference, three or more types of superimposed signals having different phase relationships of the transmission signal and the receive signal may be switched. This variant form will be described below.

Figure 10:
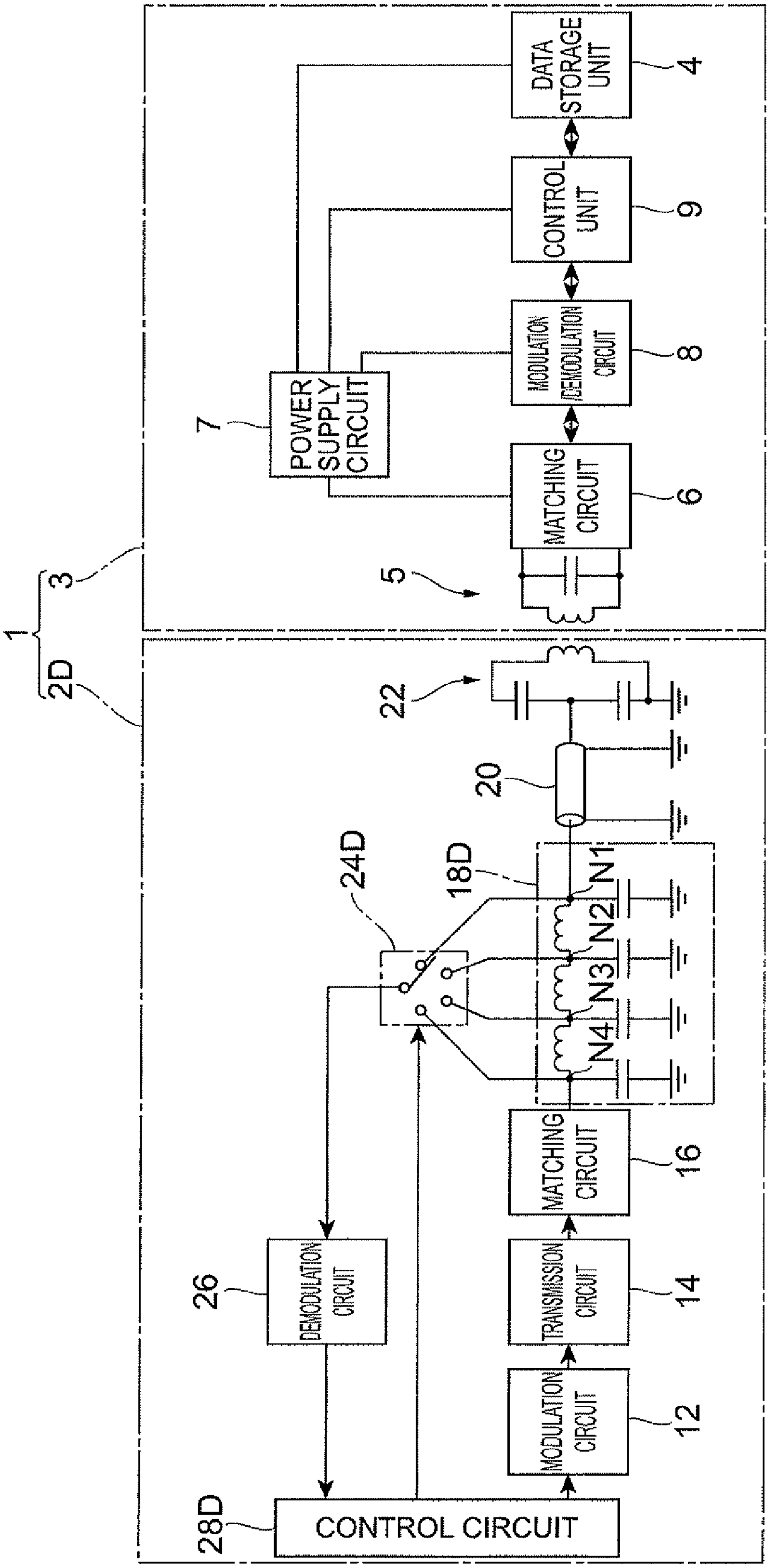
FIG. 10 is a circuit diagram depicting an RFID system and an RFID reader/writer according to a variant form of the present invention.

FIG. 10 is a circuit diagram depicting an RFID system and an RFID reader/writer according to a variant form of the present invention. The RFID system 1D shown in FIG. 10 has an RFID reader/writer 2D instead of the RFID reader/writer 2 in the RFID system 1, which is the difference from the first embodiment. The RFID reader/writer 2D has a phase shift circuit 18D, switching circuit 24D and control circuit 28D, instead of the phase shift circuit 18, switching circuit 24 and control circuit 28 in the RFID reader/writer 2, which is the difference from the first embodiment.

The phase shift circuit 18D is comprised of three π type LC filters connected in a ladder formation, for example, and for each LC filter, the phase shift amount is set to 20 degrees, for example. The switching circuit 24D switches nodes N1 to N4 in the phase shift circuit 18D to which the demodulation circuit 26 is connected according to the switching signal from the control circuit 28D. If the demodulation signal from the demodulation circuit 26 cannot be recognized, the control circuit 28D has the switching circuit 24 sequentially switch the connection between the demodulation circuit 26 and the nodes N1 to N4. The control circuit 28D may have the switching circuit 24D sequentially switch the connection between the demodulation circuit 26 and the nodes N1 to N4 in advance, detect the demodulation signal in each connection, and decide the connection between the demodulation circuit 26 and the nodes N1 to N4 such that the amplitude difference in the demodulation signal becomes the maximum. Thereby the modulation amplitude difference of an appropriate demodulation signal can be obtained.

Needless to say, the concept of the present variant form can also be applied to the second and the third embodiments.

As described above, according to the present invention, a receive signal can be appropriately demodulated, even if a communication null phenomena occurs.

What is claimed is:

1. A transmitter/receiver for radio communication, comprising:

a transmission circuit for generating a transmission signal;

a demodulation circuit for demodulating a receive signal;

an antenna circuit for transmitting said transmission signal from said transmission circuit, and receiving said receive signal and guiding said receive signal to said demodulation circuit;

a phase shift circuit which is disposed between said transmission circuit and said antenna circuit;

a switching circuit which switches between connecting said transmission circuit and said demodulation circuit to said antenna circuit not via said phase shift circuit, and connecting said transmission circuit and said demodulation circuit to said antenna circuit via said phase shift circuit; and a control circuit for having said switching circuit perform switching when a demodulation signal from said demodulation circuit cannot be obtained within a predetermined time, wherein a phase shift amount of said phase shift circuit is (2N−1) times of 45 degrees of a carrier wave in said transmission signal±15 degrees, N being an integer equal to or greater than two.

2. The transmitter/receiver for radio communication according to claim 1, wherein said receive signal is generated by a load modulation system, and said demodulation circuit uses an amplitude demodulation system.

3. A transmitter/receiver for radio communication, comprising:

a transmission circuit for generating a transmission signal;

a demodulation circuit for demodulating a receive signal;

an antenna circuit for transmitting said transmission signal from said transmission circuit, and receiving said receive signal and guiding said receive signal to said demodulation circuit;

a phase shift circuit which is disposed between said transmission circuit and said antenna circuit;

a switching circuit which switches between connecting said transmission circuit and said demodulation circuit to said antenna circuit not via said phase shift circuit, and connecting said transmission circuit and said demodulation circuit to said antenna circuit via said phase shill circuit; and a control circuit which causes said switching circuit to perform switching repeatedly and causes said switching circuit to stop switching when a demodulation signal from said demodulation circuit can be obtained, wherein a phase shift amount of said phase shill circuit is (2N−1) times of 45 degrees of a carrier wave in said transmission signal±15 degrees, N being an integer equal to or greater than two.

4. The transmitter/receiver for radio communication according to claim 3, wherein said receive signal is generated by a load modulation system, and said demodulation circuit uses an amplitude demodulation system.

* * * * *